US011939179B2

(12) United States Patent
Kamigiku

(10) Patent No.: US 11,939,179 B2
(45) Date of Patent: Mar. 26, 2024

(54) BASE MATERIAL CONVEYING DEVICE, PRINTING APPARATUS, COATING APPARATUS AND BASE MATERIAL ROLL DIAMETER OBTAINING METHOD

(71) Applicant: SCREEN HOLDINGS CO., LTD., Kyoto (JP)

(72) Inventor: Takashi Kamigiku, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 445 days.

(21) Appl. No.: 17/171,498

(22) Filed: Feb. 9, 2021

(65) Prior Publication Data

US 2021/0300708 A1 Sep. 30, 2021

(30) Foreign Application Priority Data

Mar. 24, 2020 (JP) ................................. 2020-052841

(51) Int. Cl.
*B65H 23/00* (2006.01)
*B05C 13/02* (2006.01)
(Continued)

(52) U.S. Cl.
CPC ........... *B65H 23/005* (2013.01); *B05C 13/02* (2013.01); *B41J 15/044* (2013.01); *B41J 15/048* (2013.01);
(Continued)

(58) Field of Classification Search
None
See application file for complete search history.

(56) References Cited

U.S. PATENT DOCUMENTS 3,537,662 A * 11/1970 Keesling ................ B65H 29/02 242/541.2
RE28,414 E * 5/1975 Keesling et al. .. B65H 19/2276 33/732

(Continued)

FOREIGN PATENT DOCUMENTS

CN 103979349 A 8/2014
JP 09-301585 A 11/1997

(Continued)

OTHER PUBLICATIONS

Japanese Notice of Reasons for Refusal issued in corresponding Japanese Patent Application No. 2020-052841, dated Oct. 3, 2023.

(Continued)

*Primary Examiner* — Jethro M. Pence
(74) *Attorney, Agent, or Firm* — Rimon P.C.

(57) ABSTRACT

The measured winding diameter values Ds1(d) corresponding to the conveying distance d are measured by measuring the diameter of the printing medium M wound on the unwinding roll 71 by the diameter sensor 77. The measured winding diameter values Ds1(d) are smoothed by the low-pass filter to extract the smoothed winding diameter values Ds_avg1(d). By calculating the value of the diameter based on the initial diameter value Do1, the thickness value Tm and the conveying distance of the printing medium M, the calculated winding diameter values Dc1(d) are calculated. An operation of calculating the difference Ddiff1(d) between the calculated winding diameter value Dc1(d) and the smoothed winding diameter value Ds_avg1(d) while compensating for the delay by the low-pass filter is performed whereby the differences Ddiff1(d) are calculated. The calculated winding diameter value Dc1(d) are corrected by the differences Ddiff1(d).

7 Claims, 8 Drawing Sheets

(51) Int. Cl.

| | |
|---|---|
| ***B41J 15/04*** | (2006.01) |
| ***B65H 18/14*** | (2006.01) |
| ***B65H 18/16*** | (2006.01) |
| ***B65H 23/18*** | (2006.01) |

(52) U.S. Cl.

CPC ........... *B65H 18/145* (2013.01); *B65H 18/16* (2013.01); *B65H 23/1813* (2013.01)

(56) References Cited

U.S. PATENT DOCUMENTS

| | | | | |
|---|---|---|---|---|
| 8,393,291 | B2 * | 3/2013 | Emoto | H01M 4/1391 118/232 |
| 8,857,370 | B2 * | 10/2014 | Kida | D21H 23/22 118/712 |
| 8,992,730 | B2 * | 3/2015 | Kida | A24C 5/005 162/139 |
| 9,296,229 | B1 * | 3/2016 | Fukui | B41J 2/01 |
| 9,393,811 | B2 * | 7/2016 | Yoshida | B65H 23/0216 |
| 9,802,429 | B2 * | 10/2017 | Kawajiri | B41J 15/04 |
| 10,029,493 | B2 * | 7/2018 | Kamigiku | B65H 23/0204 |
| 10,137,538 | B2 * | 11/2018 | Muraoka | B05C 3/125 |
| 10,399,114 | B2 * | 9/2019 | Iwata | B29B 15/122 |
| 11,241,710 | B2 * | 2/2022 | Görtz | B05C 9/04 |
| 11,801,696 | B2 * | 10/2023 | Izoe | B65H 20/06 |
| 2012/0328772 | A1 * | 12/2012 | Kida | A24D 1/025 118/712 |
| 2014/0224442 | A1 * | 8/2014 | Kida | D21H 23/22 162/139 |

FOREIGN PATENT DOCUMENTS

| | | | |
|---|---|---|---|
| JP | 2004-075351 | A | 3/2004 |
| JP | 2011-026105 | A | 2/2011 |
| JP | 2014-031239 | A | 2/2014 |
| KR | 101703890 | B1 | 2/2017 |

OTHER PUBLICATIONS

Extended European Search Report issued in corresponding European Patent Application No. 21156639.3, dated Aug. 2, 2021.

* cited by examiner

BASE MATERIAL CONVEYING DEVICE, PRINTING APPARATUS, COATING APPARATUS AND BASE MATERIAL ROLL DIAMETER OBTAINING METHOD

CROSS REFERENCE TO RELATED APPLICATION

The disclosure of Japanese Patent Application No. 2020-052841 filed on Mar. 24, 2020 including specification, drawings and claims is incorporated herein by reference in its entirety.

BACKGROUND OF THE INVENTION

1. Field of the Invention

This invention relates to a technique for obtaining a diameter of a base material in the form of an elongated band wound on a roll of a base material conveying device.

2. Description of the Related Art

Conventionally, a base material conveying device for conveying a base material in the form of an elongated band in a roll-to-roll manner has been used in a printing apparatus for printing images on a base material, a coating apparatus for coating a base material and the like. In such a base material conveying device, a diameter of the base material wound on a roll is obtained as appropriate for the purpose of controlling an unwinding speed of the base material from an unwinding roll and controlling a tension to be given to the base material in winding the base material on a winding roll. For example, in JP 2011-26105A, a diameter of a base material is measured by a non-contact type diameter measurement sensor facing the base material.

SUMMARY OF THE INVENTION

However, since a measurement result by the sensor includes noise, it has been difficult to precisely measure the diameter of the base material wound on the roll by the sensor. Accordingly, it is considered to calculate the diameter of the base material from a conveying distance of the base material conveyed in a roll-to-roll manner. However, it has been difficult to precisely calculate the diameter of the base material due to errors included in values such as an initial diameter, a thickness and the like of the base material required for calculation.

This invention was developed in view of the above problem and aims to provide a technique capable of precisely calculating a diameter of a base material wound on a roll.

A base material conveying device according a first aspect of the invention, comprises: an unwinding roll on which a base material in the form of an elongated band is wound; a first driver which rotationally drives the unwinding roll to unwind the base material wound on the unwinding roll: a conveyor which conveys the base material unwound from the unwinding roll; a conveying distance meter which measures a conveying distance of the base material unwound from the unwinding roll and conveyed; a first diameter meter which includes a first sensor facing the base material wound on the unwinding roll and measures a plurality of first measured winding diameter values corresponding to the conveying distance by measuring a diameter of the base material wound on the unwinding roll a plurality of times by the first sensor at the time of conveying the base material by the conveyor; a value acquirer which obtains a first initial diameter value which is a value of the diameter of the base material wound on the unwinding roll before the conveyance of the base material by the conveyor is started and a thickness value of the base material; and a controller including: a winding diameter calculator which calculates a plurality of first calculated winding diameter values corresponding to the conveying distance by calculating the value of the diameter of the base material wound on the unwinding roll a plurality of times at the time of conveying the base material by the conveyor based on the first initial diameter value and the thickness value of the base material obtained by the value acquirer and the conveying distance measured by the conveying distance meter; a filter unit which smooths the plurality of first measured winding diameter values corresponding to the conveying distance by a first low-pass filter to extract a plurality of first smoothed winding diameter values corresponding to the conveying distance; a difference calculator which calculates a plurality of first differences corresponding to the conveying distance by performing an operation of calculating a difference between the first calculated winding diameter value and the first smoothed winding diameter value while compensating for a delay by the first low-pass filter for the plurality of first calculated winding diameter values and the plurality of first smoothed winding diameter values; and a corrector which corrects the plurality of first calculated winding diameter values corresponding to the conveying distance by the plurality of first differences corresponding to the conveying distance.

A base material roll diameter obtaining method according to a first aspect of the invention is a base material roll diameter obtaining method to obtain a diameter of a base material wound on an unwinding roll in a base material conveying device which conveys the base material unwound from the unwinding roll by a conveyor by rotationally driving the unwinding roll on which the base material in the form of an elongated band is wound, and comprises: a value obtaining step of obtaining an initial diameter value which is a value of the diameter of the base material wound on the unwinding roll before the conveyance of the base material by the conveyor is started and a thickness value of the base material; a conveying distance measuring step of measuring a conveying distance of the base material unwound from the unwinding roll and conveyed; a diameter measuring step of measuring a plurality of measured winding diameter values corresponding to the conveying distance by measuring the diameter of the base material wound on the unwinding roll a plurality of times by a sensor facing the base material wound on the unwinding roll at the time of conveying the base material by the conveyor; a calculating step of calculating a plurality of calculated winding diameter values corresponding to the conveying distance by calculating the value of the diameter of the base material wound on the unwinding roll a plurality of times at the time of conveying the base material by the conveyor based on the initial diameter value and the thickness value of the base material obtained in the value obtaining step and the conveying distance measured in the conveying distance measuring step; a filtering step of smoothing the plurality of measured winding diameter values corresponding to the conveying distance by a low-pass filter to extract a plurality of smoothed winding diameter values corresponding to the conveying distance; a difference calculating step of calculating a plurality of differences corresponding to the conveying distance by performing an operation of calculating a difference between the calculated winding diameter value and the smoothed winding diameter value while compensating for a delay by the low-pass filter for the plurality of calculated winding diameter values and the plurality of smoothed winding diameter values; and a correcting step of correcting the plurality of calculated winding diameter values corresponding to the conveying distance by the plurality of differences corresponding to the conveying distance.

In the first aspect of the invention thus configured, the plurality of measured winding diameter values corresponding to the conveying distance are measured by measuring the diameter of the base material wound on the unwinding roll a plurality of times by the sensor facing the base material wound on the unwinding roll at the time of conveying the base material by the conveyor. Then, the plurality of measured winding diameter values corresponding to the conveying distance are smoothed by the low-pass filter to extract the plurality of smoothed winding diameter values corresponding to the conveying distance. In this way, the plurality of smoothed winding diameter values can be obtained by removing high-frequency noise from the plurality of measured winding diameter values. Further, by calculating the value of the diameter of the base material wound on the unwinding roll a plurality of times based on the initial diameter value, the thickness and the conveying distance of the base material at the time of conveying the base material by the conveyor, the plurality of calculated winding diameter values corresponding to the conveying distance are calculated. The plurality of smoothed winding diameter values and the plurality of calculated winding diameter values prepared in this way are mutually shifted with respect to the conveying distance due to the delay of the low-pass filter. Accordingly, the operation of calculating the difference between the calculated winding diameter value and the smoothed winding diameter value while compensating for the delay by the low-pass filter is performed for the plurality of calculated winding diameter values and the plurality of smoothed winding diameter values, whereby the plurality of differences corresponding to the conveying distance are calculated. Such differences can be regarded as values close to errors of the calculated winding diameter values with respect to ideal values of the diameter of the base material. Accordingly, the plurality of calculated winding diameter values corresponding to the conveying distance are corrected by the plurality of differences corresponding to the conveying distance. In this way, the diameter of the base material wound on the unwinding roll can be accurately obtained.

A base material conveying device according to a second aspect of the invention, comprises: a conveyor which conveys a base material in the form of an elongated band; a winding roll on which the base material conveyed from the conveyor is wound; a driver which rotationally drives the winding roll to wind the base material on the winding roll; a conveying distance meter whish measures a conveying distance of the base material wound on the winding roll and conveyed; a diameter meter which includes a sensor facing the base material wound on the winding roll and measures a plurality of measured winding diameter values corresponding to the conveying distance by measuring a diameter of the base material wound on the winding roll a plurality of times by the sensor at the time of conveying the base material by the conveyor; a value acquirer which obtains an initial diameter value which is a value of the diameter of the base material wound on the winding roll before the conveyance of the base material by the conveyor is started and a thickness value of the base material; and a controller including: a winding diameter calculator which calculates a plurality of calculated winding diameter values corresponding to the conveying distance by calculating the value of the diameter of the base material wound on the winding roll a plurality of times at the time of conveying the base material by the conveyor based on the initial diameter value and the thickness value of the base material obtained by the value acquirer and the conveying distance measured by the conveying distance meter; a filter unit which smooths the plurality of measured winding diameter values corresponding to the conveying distance by a low-pass filter to extract a plurality of smoothed winding diameter values corresponding to the conveying distance; a difference calculator which calculates a plurality of differences corresponding to the conveying distance by performing an operation of calculating a difference between the calculated winding diameter value and the smoothed winding diameter value while compensating for a delay by the low-pass filter for the plurality of calculated winding diameter values and the plurality of smoothed winding diameter values; and a corrector which corrects the plurality of calculated winding diameter values corresponding to the conveying distance by the plurality of differences corresponding to the conveying distance.

A base material roll diameter obtaining method according to a second aspect of the invention is a base material roll diameter obtaining method to obtain a diameter of a base material wound on a winding roll in a base material conveying device which rotationally drives the winding roll to winds the base material, which is in the form of an elongated band and conveyed from a conveyor, on the winding roll, comprising: a value obtaining step of obtaining an initial diameter value which is a value of the diameter of the base material wound on the winding roll before the conveyance of the base material by the conveyor is started and a thickness value of the base material; a conveying distance measuring step of measuring a conveying distance of the base material wound by the winding roll and conveyed; a diameter measuring step of measuring a plurality of measured winding diameter values corresponding to the conveying distance by measuring the diameter of the base material wound on the winding roll a plurality of times by a sensor facing the base material wound on the winding roll at the time of conveying the base material by the conveyor; a calculating step of calculating a plurality of calculated winding diameter values corresponding to the conveying distance by calculating the value of the diameter of the base material wound on the winding roll a plurality of times at the time of conveying the base material by the conveyor based on the initial diameter value and the thickness value of the base material obtained in the value obtaining step and the conveying distance measured in the conveying distance measuring step; a filtering step of smoothing the plurality of measured winding diameter values corresponding to the conveying distance by a low-pass filter to extract a plurality of smoothed winding diameter values corresponding to the conveying distance; a difference calculating step of calculating a plurality of differences corresponding to the conveying distance by performing an operation of calculating a difference between the calculated winding diameter value and the smoothed winding diameter value corresponding to the same conveying distance while compensating for a delay by the low-pass filter caused in the plurality of smoothed winding diameter values corresponding to the conveying distance for the plurality of calculated winding diameter values and the plurality of smoothed winding diameter values; and a correcting step of correcting the plurality of calculated winding diameter values corresponding to the conveying distance by the plurality of differences corresponding to the conveying distance.

In the second aspect of the invention thus configured, the plurality of measured winding diameter values corresponding to the conveying distance are measured by measuring the diameter of the base material wound on the winding roll a plurality of times by the sensor facing the base material wound on the winding roll at the time of conveying the base material by the conveyor. Then, the plurality of measured winding diameter values corresponding to the conveying distance are smoothed by the low-pass filter to extract the plurality of smoothed winding diameter values corresponding to the conveying distance. In this way, the plurality of smoothed winding diameter values can be obtained by removing high-frequency noise from the plurality of measured winding diameter values. Further, by calculating the value of the diameter of the base material wound on the winding roll a plurality of times based on the initial diameter value, the thickness and the conveying distance of the base material at the time of conveying the base material by the conveyor, the plurality of calculated winding diameter values corresponding to the conveying distance are calculated. The plurality of smoothed winding diameter values and the plurality of calculated winding diameter values prepared in this way are mutually shifted with respect to the conveying distance due to the delay of the low-pass filter. Accordingly, the operation of calculating the difference between the calculated winding diameter value and the smoothed winding diameter value while compensating for the delay by the low-pass filter is performed for the plurality of calculated winding diameter values and the plurality of smoothed winding diameter values, whereby the plurality of differences corresponding to the conveying distance are calculated. Such differences can be regarded as values close to errors of the calculated winding diameter values with respect to an ideal value of the diameter of the base material. Accordingly, the plurality of calculated winding diameter values corresponding to the conveying distance are corrected by the plurality of differences corresponding to the conveying distance. In this way, the diameter of the base material wound on the winding roll can be accurately obtained.

A printing apparatus according to the invention, comprises: the base material conveying device; and a printer which prints an image on the base material conveyed by the base material conveying device by ink. Accordingly, the diameter of the base material wound on the roll can be accurately obtained.

A coating apparatus according to the invention, comprises: the base material conveying device; and a coater which coats a coating liquid on the base material conveyed by the base material conveying device. Accordingly, the diameter of the base material wound on the roll can be accurately obtained.

As described above, according to the present invention, it is possible to precisely obtain a diameter of a base material wound on a roll.

As described above, according to the invention, the formation of wrinkles in an ink discharge range can be suppressed in printing an image by discharging ink to a printing medium while conveying the printing medium in a conveying direction.

DETAILED DESCRIPTION OF THE PREFERRED EMBODIMENTS

Figure 1:
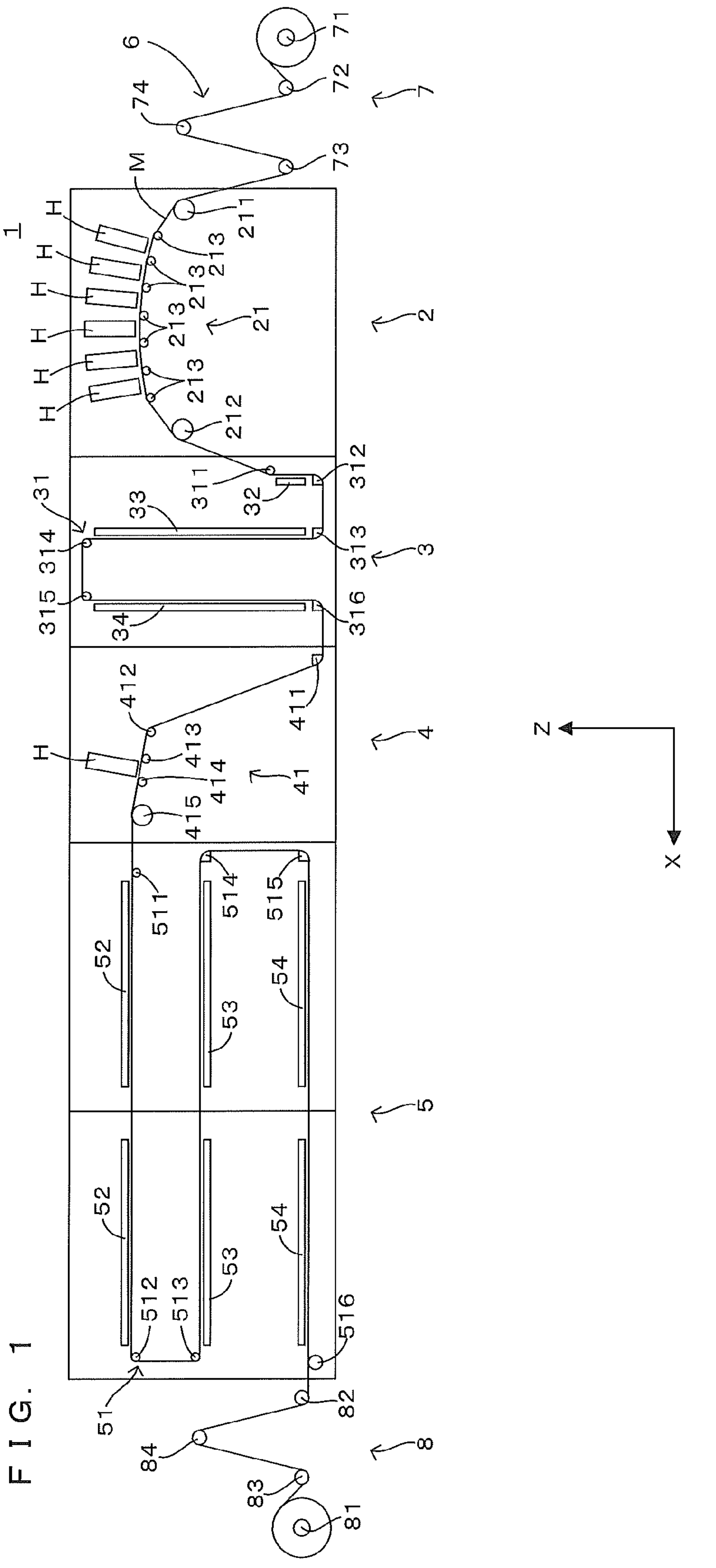
FIG. 1 is a front view schematically showing an example of a printing apparatus according to the invention.

FIG. 1 is a front view schematically showing an example of a printing apparatus according to the invention. In FIG. 1, a horizontal direction X and a vertical direction Z are shown as appropriate. As shown in FIG. 1, the printing apparatus 1 has a configuration with a printer 2, a dryer 3, a printer 4 and a dryer 5 arrayed in this order in the horizontal direction X (array direction). This printing apparatus 1 includes a base material conveying system 6 which conveys a printing medium M (base material) in the form of an elongated band. The base material conveying system 6 includes an unwinder 7 and a winder 8 and conveys the printing medium M from the unwinder 7 to the winder 8 in a roll-to-roll manner. The printer 2, the dryer 3, the printer 4 and the dryer 5 are arranged between the unwinder 7 and the winder 8. Such a printing apparatus 1 dries the printing medium M printed in the printer 2 in the dryer 3 and further dries the printing medium M printed in the printer 4 in the dryer 5 while the printing medium M is conveyed by the base material conveying system 6. Note that various materials such as paper or films can be utilized as the printing medium M, but the printing medium M is a transparent film here in this example. Further, out of both surfaces of the printing medium M, the surface on which images are to be printed is referred to as a front surface and the surface opposite to the front surface is referred to as a back surface as appropriate.

The printer 2 includes a conveyor 21 which conveys the printing medium M. The conveyor 21 includes a roller 211 to support the printing medium M loaded into the printer 2, a roller 212 to unload the printing medium M toward the dryer 3, and a plurality of rollers 213 arrayed between the rollers 211 and 212. These rollers 211, 212 and 213 support the printing medium M by being in contact with the downward facing back surface of the printing medium M. Further, the printer 2 includes a plurality of ink discharge heads H facing the front surface of the printing medium M, which is supported by the plurality of rollers 213, from above, and the plurality of ink discharge heads H print color images on the printing medium M by discharging ink of mutually different colors to the front surface of the printing medium M in an ink-jet method.

The dryer 3 includes a conveyor 31 which conveys the printing medium M unloaded from the printer 2. This conveyor 31 includes a roller 311 to support the printing medium M loaded in the dryer 3 and a pair of air turn bars 312, 313 arranged in the horizontal direction X below the roller 311. The air turn bar 312 bends the printing medium M descending from the roller 311 toward one side (left side of FIG. 1) in the horizontal direction X, and the air turn bar 313 bends the printing medium M moving in the horizontal direction X from the air turn bar 312 upward. Further, the conveyor 31 includes a pair of rollers 314, 315 arranged in the horizontal direction X above the pair of air turn bars 312, 313. The roller 314 bends the printing medium M ascending from the air turn bar 313 toward the one side in the horizontal direction X, and the roller 315 bends the printing medium M moving in the horizontal direction X from the roller 314 downward. Furthermore, the conveyor 31 includes an air turn bar 316 arranged below the roller 315. This air turn bar 316 bends the printing medium M descending from the roller 315 toward the one side in the horizontal direction X and unloads the printing medium M toward the printer 4. The rollers 311, 314 and 315 support the printing medium M by being in contact with the back surface of the printing medium M, and the air turn bars 312, 313 and 316 support the printing medium M by injecting air to the front surface of the printing medium M.

Further, the dryer 3 includes a heater 32 facing the front surface of the printing medium M between the roller 311 and the air turn bar 312, a heater 33 facing the front surface of the printing medium M between the air turn bar 313 and the roller 314, and a heater 34 facing the front surface of the printing medium M between the roller 315 and the air turn bar 316. These heaters 32, 33 and 34 dry the ink attached to the printing medium M by heating the front surface of the printing medium M.

The printer 4 includes a conveyor 41 which conveys the printing medium M unloaded from the dryer 3. This conveyor 41 includes an air turn bar 411 to bend the printing medium M loaded into the printer 4 upward, and rollers 412, 413, 414 and 415 arranged above the air turn bar 411. These rollers 412 to 415 convey the printing medium M ascending from the air turn bar 411 toward the one side in the horizontal direction X. In this way, the printing medium M is unloaded from the roller 415 toward the dryer 5 in the horizontal direction X. The air turn bar 411 supports the printing medium M by injecting air to the front surface of the printing medium M, and the rollers 412 to 415 support the printing medium M by being in contact with the downward facing back surface of the printing medium M. Further, the printer 4 includes an ink discharge head H facing the front surface of the printing medium M, which is supported by a plurality of the rollers 413, 414, from above, and the ink discharge head H prints white images on the printing medium M by discharging white ink to the front surface of the printing medium M by the ink-jet method.

The dryer 5 includes a conveyor 51 which conveys the printing medium M unloaded from the printer 4. The conveyor 51 includes a roller 511 to support the printing medium M loaded into the dryer 5, and a pair of rollers 512, 513 arranged in the vertical direction Z on one side in the horizontal direction X of the roller 511. The roller 512 bends the printing medium M conveyed toward the one side in the horizontal direction X from the roller 511 downward, and the roller 513 bends the printing medium descending from the roller 512 toward the other side (right side of FIG. 1) in the horizontal direction X. Further, the conveyor 51 includes a pair of air turn bars 514, 515 arranged in the vertical direction Z on the other side in the horizontal direction X of the roller 513 and below the roller 511. The air turn bar 514 bends the printing medium M conveyed toward the other side in the horizontal direction X from the roller 513 downward, and the air turn bar 515 bends the printing medium M descending from the air turn bar 514 toward the one side in the horizontal direction X. Further, the conveyor 51 includes a roller 516 arranged on one side in the horizontal direction X of the air turn bar 515, and the roller 516 conveys the printing medium M conveyed toward the one side in the horizontal direction from the air turn bar 515 further toward the one side. In this way, the printing medium M is unloaded by the roller 516. The rollers 511, 512, 513 and 516 support the printing medium M by being in contact with the back surface of the printing medium M, and the air turn bars 514, 515 support the printing medium M by injecting air to the front surface of the printing medium M.

Further, the dryer 5 includes heaters 52 facing the front surface of the printing medium M between the roller 511 and the roller 512, heaters 53 facing the front surface of the printing medium M between the roller 513 and the air turn bar 514, and heaters 54 facing the front surface of the printing medium M between the air turn bar 515 and the roller 516. These heaters 52, 53 and 54 dry the ink attached to the printing medium M by heating the front surface of the printing medium M.

As described above, in the printing apparatus 1, the conveyors 21, 31, 41 and 51 to convey the printing medium M are provided in the printer 2, the dryer 3, the printer 4 and the dryer 5. These conveyors 21, 31, 41 and 51 constitute the base material conveying system 6 in cooperation with the unwinder 7 and the winder 8.

Figure 2:
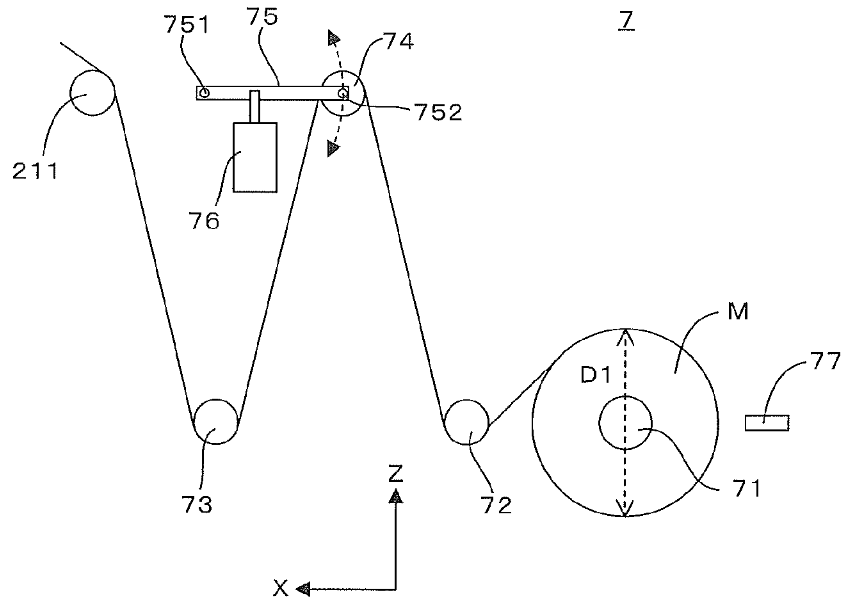
FIG. 2 is a front view schematically showing the configuration of the unwinder of a base material conveying device.

FIG. 2 is a front view schematically showing the configuration of the unwinder of a base material conveying device. The unwinder 7 includes an unwinding roll 71 on which the printing medium M is wound, two rollers 72, 73 arranged between the unwinding roll 71 and the roller 211 to be in contact with the printing medium M, which is unwound from the unwinding roll 71 to the roller 211, from above, and a dancer roller 74 to be in contact with the printing medium M from below between the rollers 72 and 73.

Further, the unwinder 7 includes a rotary arm 75 to support the dancer roller 74. This rotary arm 75 is vertically rotatable about a rotary shaft 751 provided on one end thereof, and the dancer roller 74 is rotatably supported on a rotary shaft 752 provided on the other end of the rotary arm 75. Further, the unwinder 7 includes a cylinder 76 to vertically drive the rotary arm 75 at a position between the rotary shaft 751 and the rotary shaft 752. This cylinder 76 controls the drive of the dancer roller 74 so that a certain tension is given to the printing medium M from the dancer roller 74. Specifically, the cylinder 76 vertically drives the rotary arm 75 and the dancer roller 74 is vertically displaced according to a vertical motion of the rotary arm 75, whereby the certain tension is given to the printing medium M. Further, the unwinder 7 includes a diameter sensor 77 arranged to face the printing medium M wound on the unwinding roll 71, and this diameter sensor 77 measures a diameter D1 of the rolled printing medium M.

Figure 3:
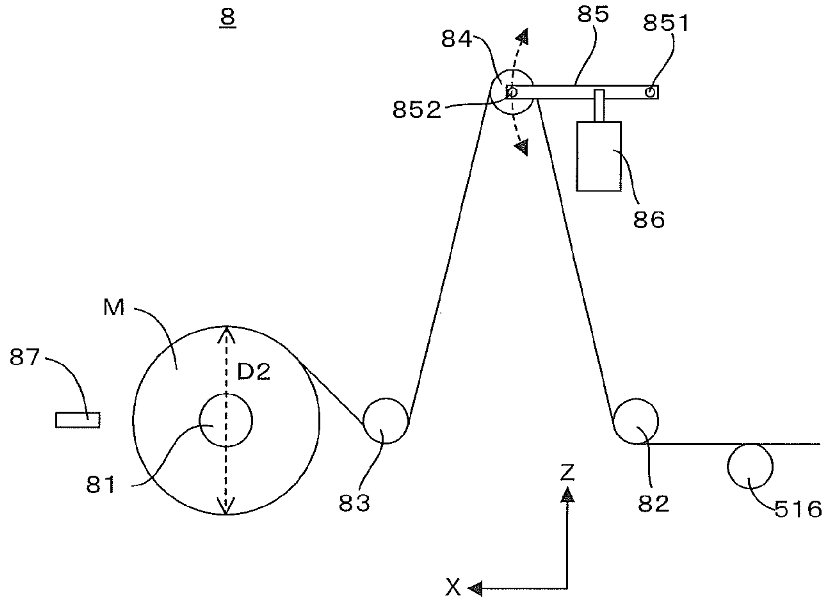
FIG. 3 is a front view schematically showing the configuration of the winder of the base material conveying device.

FIG. 3 is a front view schematically showing the configuration of the winder of the base material conveying device. The winder 8 includes a winding roll 81 on which the printing medium M is wound, two rollers 82, 83 arranged between the winding roll 81 and the roller 516 of the dryer 5 to be in contact with the printing medium M, which is wound on the winding roll 81 from the roller 516, from above, and a dancer roller 84 to be in contact with the printing medium M from below between the rollers 82 and 83.

The winder 8 includes a rotary arm 85 to support the dancer roller 84. This rotary arm 85 is vertically rotatable about a rotary shaft 851 provided on one end thereof, and the dancer roller 84 is rotatably supported on a rotary shaft 852 provided on the other end of the rotary arm 85. Further, the winder 8 includes a cylinder 86 to vertically drive the rotary arm 85 at a position between the rotary shaft 851 and the rotary shaft 852. This cylinder 86 controls the drive of the dancer roller 84 so that a certain tension is given to the printing medium M from the dancer roller 84. Specifically, the cylinder 86 vertically drives the rotary arm 85 and the dancer roller 84 is vertically displaced according to a vertical motion of the rotary arm 85, whereby the certain tension is given to the printing medium M. Further, the winder 8 includes a diameter sensor 87 arranged to face the printing medium M wound on the winding roll 81, and this diameter sensor 87 measures a diameter D2 of the rolled printing medium M.

Note that the diameter sensors 77, 87 of the unwinder 7 and the winder 8 are non-contact type distance sensors and measure the diameters D1, D2 of the printing medium M by detecting distances to the printing medium M. Optical sensors, ultrasonic sensors and the like can be used as such diameter sensors 77, 87. In this example, the diameter sensors 77, 87 are ultrasonic sensors capable of measuring the diameters D1, D2 of the transparent printing medium M. Incidentally, although the diameters are measured by the diameter sensors 77, 87 in this example, radii may be measured thereby.

Figure 4:
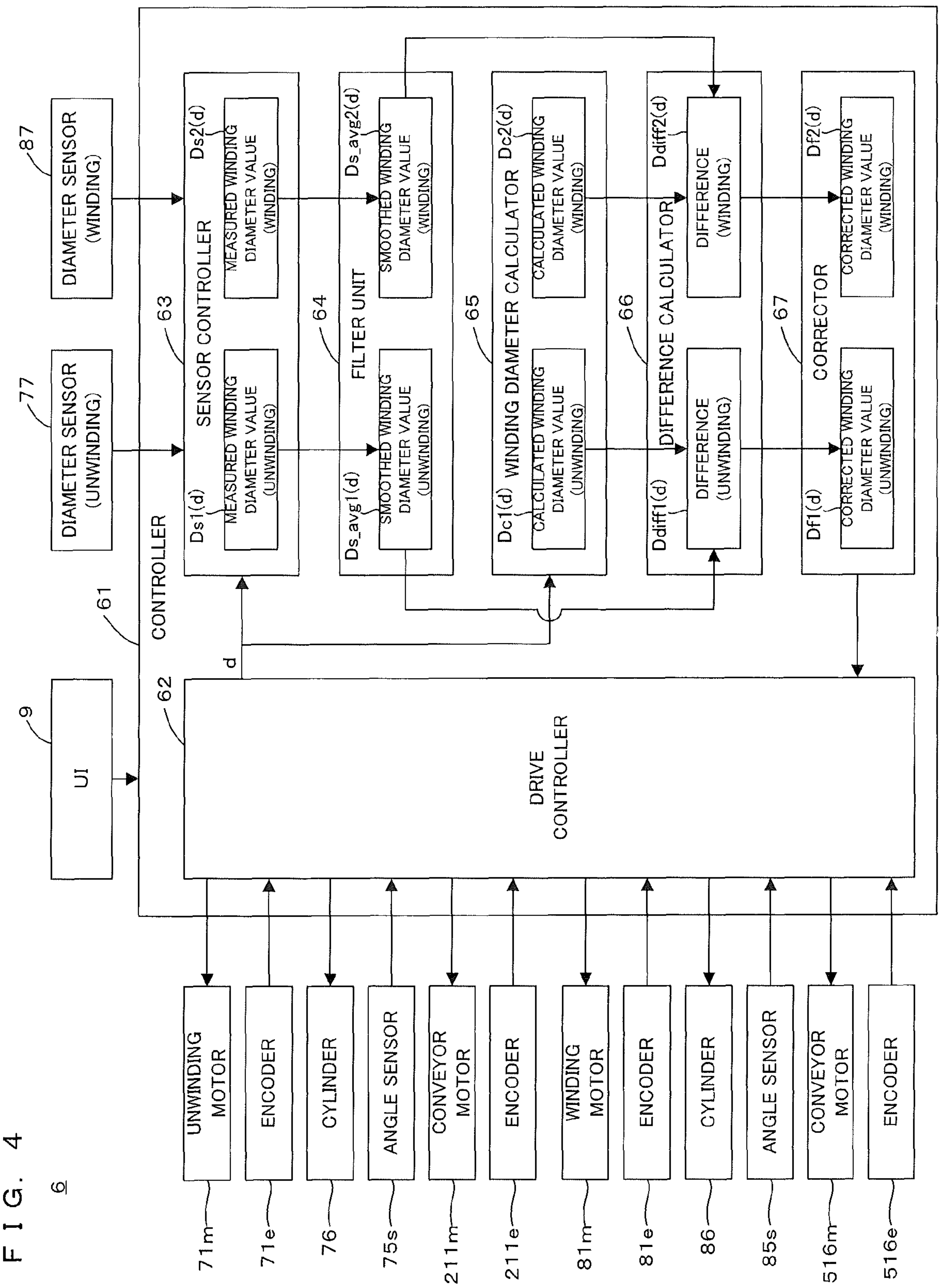
FIG. 4 is a block diagram showing an electrical configuration of the base material conveying system.

FIG. 4 is a block diagram showing an electrical configuration of the base material conveying system. As shown in FIG. 4, an unwinding motor 71*m* to rotationally drive the unwinding roll 71 and an encoder 71*e* to detect a rotational position of the unwinding motor 71*m* are provided in the base material conveying system 6. Further, an angle sensor 75*s* to detect a rotational angle of the rotary arm 75 about the rotary shaft 751 is provided. Furthermore, a conveyor motor 211*m* to rotationally drive the roller 211 and an encoder 211*e* to detect a rotational position of the conveyor motor 211*m* are provided.

Similarly, a winding motor 81*m* to rotationally drive the winding roll 81 and an encoder 81*e* to detect a rotational position of the winding motor 81*m* are provided in the base material conveying system 6. Further, an angle sensor 85*s* to detect a rotational angle of the rotary arm 85 about the rotary shaft 851 is provided. Furthermore, a conveyor motor 516*m* to rotationally drive the roller 516 and an encoder 516*e* to detect a rotational position of the conveyor motor 516*m* are provided.

Further, the base material conveying system 6 includes a UI (User Interface) 9 and a user can perform various settings in a controller 61 by performing an input operation on the UI 9. An input device such as a keyboard or a mouse, a touch panel display or the like can be used as such a UI 9.

Furthermore, the base material conveying system 6 includes the controller 61 to perform an operation necessary to convey the printing medium M. The controller 61 is, for example, constituted by a FPGA (Field-Programmable Gate Array), a processor or the like.

This controller 61 is provided with a drive controller 62 to execute a drive control of the printing medium M. The drive controller 62 rotates the conveyor motor 211*m* at a predetermined speed by executing a speed control of the conveyor motor 211*m* based on an output of the encoder 211*e*. In this way, the roller 211 rotates at a predetermined speed to convey the printing medium M, which is unwound from the unwinding roll 71, at a constant speed. Further, the drive controller 62 executes a drive control of the unwinding motor 71*m*, monitors an output of the encoder 71*e* and executes a drive control of the cylinder 76.

Further, the drive controller 62 rotates the conveyor motor 516*m* at a predetermined speed by executing a speed control of the conveyor motor 516*m* based on an output of the encoder 516*e*. In this way, the roller 516 rotates at a predetermined speed to convey the printing medium M toward the winding roll 81 at a constant speed. Further, the drive controller 62 executes a drive control of the winding motor 81*m*, monitors an output of the encoder 81*e* and executes a drive control of the cylinder 86.

Such a controller 61 controls the unwinding motor 71*m* and the winding motor 81*m* based on results obtained by measuring the diameters D1, D2 of the rolled printing medium M by the diameter sensors 77, 87. However, the measurement results of the diameter sensors 77, 87 include high-frequency noise. Particularly in the case of using ultrasonic sensors, noise is prominent. Thus, it is difficult to measure the diameters D1, D2 with high accuracy by the diameter sensors 77, 87. Accordingly, the controller 61 obtains the diameters D1, D2 by correcting the measurement results of the diameter sensors 77, 87 during the conveyance of the printing medium M. Next, this point is described first for an unwinding side and then for a winding side.

The controller 61 includes a sensor controller 63 to obtain a measured winding diameter value Ds1(d) of the diameter D1 of the printing medium M wound on the unwinding roll 71 by the diameter sensor 77. This sensor controller 63 obtains a plurality of the measured winding diameter values Ds1(d) by repeatedly measuring the measured winding diameter value Ds1(d) at a predetermined sampling interval by the diameter sensor 77. Note that the sampling interval is set at such an interval during which the printing medium M is conveyed by a unit distance (e.g. 1 m), the sensor controller 63 measures the measured winding diameter values Ds1(d) each time the printing medium M is conveyed by the unit distance. In this way, the plurality of measured winding diameter values Ds1(d) (d=1 m, 2 m, 3 m, 4 m) corresponding to a conveying distance d of the printing medium M are measured. Incidentally, the conveying distance d is, for example, obtained by the drive controller 62 based on an output of the encoder 211*e* of the conveyor motor 211*m*, and output to the sensor controller 63 from the drive controller 62.

The controller 61 includes a filter unit 64 to smooth series data by a low-pass filter, and the plurality of measured winding diameter values Ds1(d) (series data) measured by the sensor controller 63 are smoothed by the filter unit 64, and a plurality of smoothed winding diameter values Ds_avg1(d) are calculated. In this way, the plurality of smoothed winding diameter values Ds_avg1(d) corresponding to the conveying distance d of the printing medium M are obtained. Note that a simple moving average filter is used as the low-pass filter.

Further, the controller 61 includes a winding diameter calculator 65 to obtain the diameter D1 of the printing medium M wound on the unwinding roll 71 by calculation. This winding diameter calculator 65 calculates a calculated winding diameter value Dc1(d) based on an initial diameter value Do1 as a winding diameter value of the printing medium M wound on the unwinding roll 71 in a state where the conveyance of the printing medium M by the roller 211 is stopped (i.e. before the conveyance of the printing medium M is started), a thickness value Tm of the printing medium M and the conveying distance d by the following equation:

$$Dc1(d)=((Do1/2)^2\times\pi-Tm\times d)/\pi)^{1/2}\times 2.$$

Values input to the UI 9 by the user are used as the initial diameter value Do1 and the thickness value Tm of the printing medium M. In this way, a plurality of the calculated winding diameter values Dc1(d) corresponding to the conveying distance d of the printing medium are calculated. Note that the initial diameter value Do1 or the thickness value Tm possibly includes an error. Since such an error does not vary with time unlike noise, a steady error is possibly caused in the calculated winding diameter value Dc1(d).

Furthermore, the controller 61 includes a difference calculator 66 to calculate a difference Ddiff1(d) between the calculated winding diameter value Dc1(d) and the smoothed winding diameter value Ds_avg1(d). Incidentally, a delay by the simple moving average filter is caused in series data composed of the plurality of smoothed winding diameter values Ds_avg1(d). Accordingly, in calculating the difference Ddiff1(d), the difference calculator 66 compensates for this delay. Specifically, a delay amount by the simple moving average filter is equivalent to half the number of taps N of a simple moving average. Thus, the calculated winding diameter value Dc1(d) is shifted with respect to the conveying distance d by a distance equivalent to half the number of taps N. Here, to shift with respect to the conveying distance d means an operation of translating the calculated winding diameter value Dc1(d) in a horizontal axis direction in a graph taking the conveying distance d on a horizontal axis and the calculated winding diameter value Dc1(d) on a vertical axis. That is, the difference Ddiff1(d) is calculated by the following equation:

$$Ddiff1(d)=Dc1(d-N/2)-Ds\_avg1(d).$$

In this way, a plurality of the differences Ddiff1(d) corresponding to the conveying distance d of the printing medium M are calculated.

Further, the controller 61 includes a corrector 67 to correct the calculated winding diameter value Dc1(d) by the difference Ddiff1(d). This controller 67 obtains a corrected winding diameter value Df1(d) by correction by the following equation:

$$Df1(d)=Dc1(d)-Ddiff1(d).$$

In this way, a plurality of the corrected winding diameter values Df1(d) corresponding to the conveying distance d are calculated.

This corrected winding diameter value Df1(d) is used in a control by the drive controller 62. For example, in the case of controlling the speed of the printing medium M unwound from the unwinding roll 71 according to the speed of the printing medium M conveyed at the constant speed by the roller 211, the rotation speed of the unwinding motor **71*m* is controlled based on the rotation speed of the unwinding roll 71 obtained from an output of the encoder 71*e* and the corrected winding diameter value Df1(d). In this way, an unwinding speed of the printing medium M from the unwinding roll 71 can be adjusted to a conveying speed of the printing medium M by the roller 211**.

A correction similar to the above one is performed for the diameter D2 of the printing medium M wound on the winding roll 81. That is, the sensor controller 63 obtains a plurality of measured winding diameter values Ds2(d) by repeatedly measuring the measured winding diameter value Ds2(d) at a predetermined sampling interval by the diameter sensor 87. In this way, a plurality of the measured winding diameter values Ds2(d) corresponding to the conveying distance d of the printing medium M are measured. Then, the plurality of measured winding diameter values Ds2(d) are smoothed by the filter unit 64 and a plurality of smoothed winding diameter values Ds_avg2(d) are calculated. In this way, the plurality of smoothed winding diameter values Ds_avg2(d) corresponding to the conveying distance d of the printing medium M are obtained.

Further, the winding diameter calculator 65 calculates a calculated winding diameter value Dc2(d) based on an initial diameter value Do2 as a winding diameter value of the printing medium M wound on the winding roll 81, the thickness value Tm of the printing medium M and the conveying distance d by the following equation:

$$Dc2(d)=((Do2/2)^2\times\pi-Tm\times d)/\pi)^{1/2}\times 2.$$

A value input to the UI 9 by the user is used as the initial diameter value Do2 of the printing medium M. In this way, a plurality of the calculated winding diameter values Dc2(d) corresponding to the conveying distance d of the printing medium M are calculated.

Further, the difference calculator 66 calculates a difference Ddiff2(d) by the following equation:

$$Ddiff2(d)=Dc2(d-N/2)-Ds\_avg2(d).$$

In this way, a plurality of the differences Ddiff2(d) corresponding to the conveying distance d of the printing medium M are calculated. Then, the corrector 67 obtains a corrected winding diameter value Df2(d) by correction by the following equation:

$$Df2(d)=Dc2(d)-Ddiff2(d).$$

In this way, a plurality of the corrected winding diameter values Df2(d) corresponding to the conveying distance d are calculated.

This corrected winding diameter value Df2(d) is used in a control by the drive controller 62. For example, a taper tension control of reducing a tension given by the cylinder 86 in winding the printing medium M on the winding roll 81 with an increase in the diameter of the printing medium M is executed based on the corrected winding diameter value Df2(d).

In the embodiment described above, the plurality of measured winding diameter values Ds1(d) corresponding to the conveying distance d are measured by measuring the diameter of the printing medium M wound on the unwinding roll 71 a plurality of times by the diameter sensor 77 facing the printing medium M (base material) wound on the unwinding roll 71 at the time of conveying the printing medium M by the conveyors 21, 31, 41 and 51. Then, the plurality of measured winding diameter values Ds1(d) corresponding to the conveying distance d are smoothed by the low-pass filter to extract the plurality of smoothed winding diameter values Ds_avg1(d) corresponding to the conveying distance d. In this way, the plurality of smoothed winding diameter values Ds_avg1(d) can be obtained by removing high-frequency noise from the plurality of measured winding diameter values Ds1(d). Further, by calculating the value of the diameter of the printing medium M wound on the unwinding roll 71 based on the initial diameter value Do1 of the printing medium M, the thickness value Tm and the conveying distance d a plurality of times at the time of conveying the printing medium M, the plurality of calculated winding diameter values Dc1(d) corresponding to the conveying distance d are calculated. The plurality of smoothed winding diameter values Ds_avg1(d) and the plurality of calculated winding diameter values Dc1(d) prepared in this way are mutually shifted with respect to the conveying distance d due to the delay of the low-pass filter. Accordingly, an operation of calculating the difference Ddiff1(d) between the calculated winding diameter value Dc1(d) and the smoothed winding diameter value Ds_avg1 (d) while compensating for the delay by the low-pass filter is performed for the plurality of calculated winding diameter values Dc1(d) and the plurality of smoothed winding diameter values Ds_avg1(d), whereby the plurality of differences Ddiff1(d) corresponding to the conveying distance d are calculated. Such differences Ddiff1(d) can be regarded as values close to errors of the calculated winding diameter values Dc1(d) with respect to ideal values Di1(d) of the diameter of the printing medium M. Accordingly, the plurality of calculated winding diameter value Dc1(d) corresponding to the conveying distance d are corrected by the plurality of differences Ddiff1(d) corresponding to the conveying distance d. In this way, the diameter of the printing medium M wound on the unwinding roll 71 can be accurately obtained.

Specifically, the difference calculator 66 compensates for the delay by shifting the plurality of calculated winding diameter values Dc1(d) with respect to the conveying distance d by an amount equivalent to the delay by the low-pass filter. By calculating the difference Dff1(d) between the calculated winding diameter value Dc1(d) and the smoothed winding diameter value Ds_avg1(d) while compensating for the delay by the low-pass filter in this way, the difference Ddiff1(d) giving a value close to the error of the calculated winding diameter value Dc1(d) with respect to the ideal value Di1(d) of the diameter of the printing medium M can be precisely obtained.

Further, the low-pass filter used by the filter unit 64 is a moving average filter. The high-frequency noise can be precisely removed from the plurality of measured winding diameter values Ds1(d) by such a moving average filter.

Further, the UI 9 obtains the initial diameter value Do1 by the input of the user. In such a configuration, the initial diameter value Do1 can be relatively easily obtained.

Further, the diameter sensor 77 is an ultrasonic sensor and the printing medium M is transparent. In such a configuration, the diameter of the transparent printing medium M can be measured by the ultrasonic sensor. Since a measurement result by the ultrasonic sensor includes noise, the application of the invention is particularly preferred.

Further, the plurality of measured winding diameter values Ds2(d) corresponding to the conveying distance d are measured by measuring the diameter of the printing medium M wound on the winding roll 81 a plurality of times by the diameter sensor 87 facing the printing medium M wound on the winding roll 81 at the time of conveying the printing medium M by the conveyors 21, 31, 41 and 51. Then, the plurality of measured winding diameter values Ds2(d) corresponding to the conveying distance d are smoothed by the low-pass filter to extract the plurality of smoothed winding diameter values Ds_avg2(d) corresponding to the conveying distance d. In this way, the plurality of smoothed winding diameter values Ds_avg2(d) can be obtained by removing high-frequency noise from the plurality of measured winding diameter values Ds2(d). Further, by calculating the value of the diameter of the printing medium M wound on the winding roll 81 based on the initial diameter value Do2 of the printing medium M, the thickness value Tm and the conveying distance D a plurality of times at the time of conveying the printing medium M, the plurality of calculated winding diameter values Dc2(d) corresponding to the conveying distance d are calculated. The plurality of smoothed winding diameter values Ds_avg2(d) and the plurality of calculated winding diameter values Dc2(d) prepared in this way are mutually shifted with respect to the conveying distance d by the delay of the low-pass filter. Accordingly, an operation of calculating the difference Ddiff2(d) between the calculated winding diameter value Dc2(d) and the smoothed winding diameter value Ds_avg2 (d) while compensating for the delay by the low-pass filter is performed for the plurality of calculated winding diameter values Dc2(d) and the plurality of smoothed winding diameter values Ds_avg2(d), whereby the plurality of differences Ddiff2(d) corresponding to the conveying distance d are calculated. Such differences Ddiff2(d) can be regarded as values close to errors of the calculated winding diameter values Dc2(d) with respect to an ideal value Di2(d) of the diameter of the printing medium M. Accordingly, the plurality of calculated winding diameter value Dc2(d) corresponding to the conveying distance d are corrected by the plurality of differences Ddiff2(d) corresponding to the conveying distance d. In this way, the diameter of the printing medium M wound on the winding roll 81 can be accurately obtained.

Specifically, the difference calculator 66 compensates for the delay by shifting the plurality of calculated winding diameter values Dc2(d) with respect to the conveying distance d by an amount equivalent to the delay by the low-pass filter. By calculating the difference Dff2(d) between the calculated winding diameter value Dc2(d) and the smoothed winding diameter value Ds_avg2(d) while compensating for the delay by the low-pass filter in this way, the difference Ddiff2(d) giving a value close to the error of the calculated winding diameter value Dc2(d) with respect to the ideal value Di2(d) of the diameter of the printing medium M can be precisely obtained.

Further, the low-pass filter used by the filter unit 64 is a moving average filter. The high-frequency noise can be precisely removed from the plurality of measured winding diameter values Ds2(d) by such a moving average filter.

Further, the UI 9 obtains the initial diameter value Do2 by the input of the user. In such a configuration, the initial diameter value Do2 can be relatively easily obtained.

Further, the diameter sensor 87 is an ultrasonic sensor and the printing medium M is transparent. In such a configuration, the diameter of the transparent printing medium M can be measured by the ultrasonic sensor. Since a measurement result by the ultrasonic sensor includes noise, the application of the invention is particularly preferred.

Figure 5:
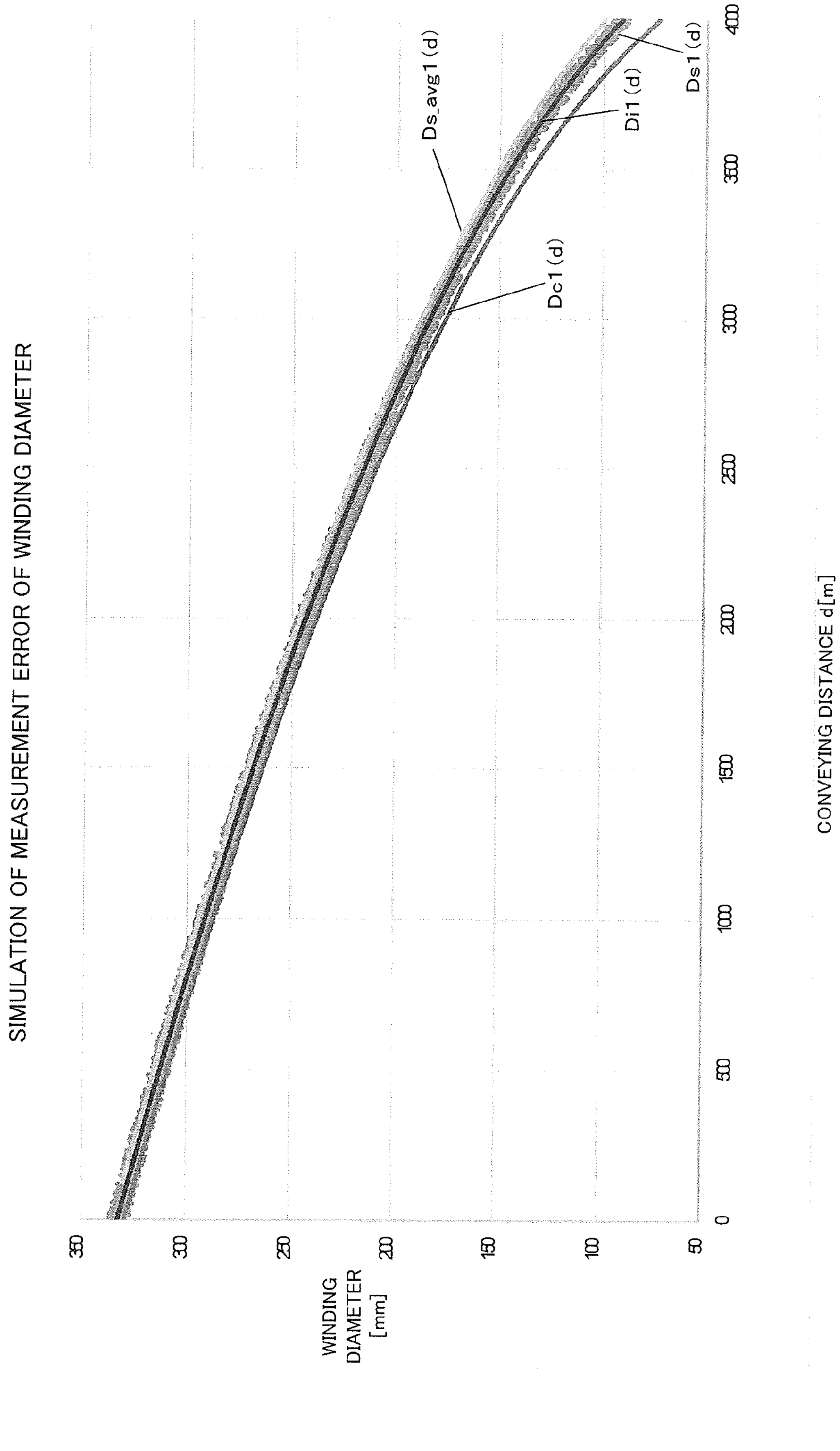
FIG. 5 is a graph showing an example of unwinding the printing medium M from the unwinding roll.

Next, a confirmation result on effects of the above embodiment by simulation is described. FIG. 5 is a graph showing an example of unwinding the printing medium M from the unwinding roll, wherein a horizontal axis represents the conveying distance d (in) and a vertical axis represents the winding diameter (mm) of the printing medium M wound on the unwinding roll 71. In this simulation, the measured winding diameter value Ds1(d) was generated in a pseudo manner by adding noise generated by a random number to the ideal value Di1(d) of the winding diameter of the printing medium M. Further, the calculated winding diameter value Dc1(d) is calculated while an error is added to the initial diameter value Do1 or the thickness value Tm of the printing medium M. As shown in FIG. 5, the calculated winding diameter value Dc1(d) steadily deviates from the ideal value Di1(d). Further, a delay by the simple moving average filter is caused in the smoothed winding diameter value Ds_avg1(d).

Figure 6:
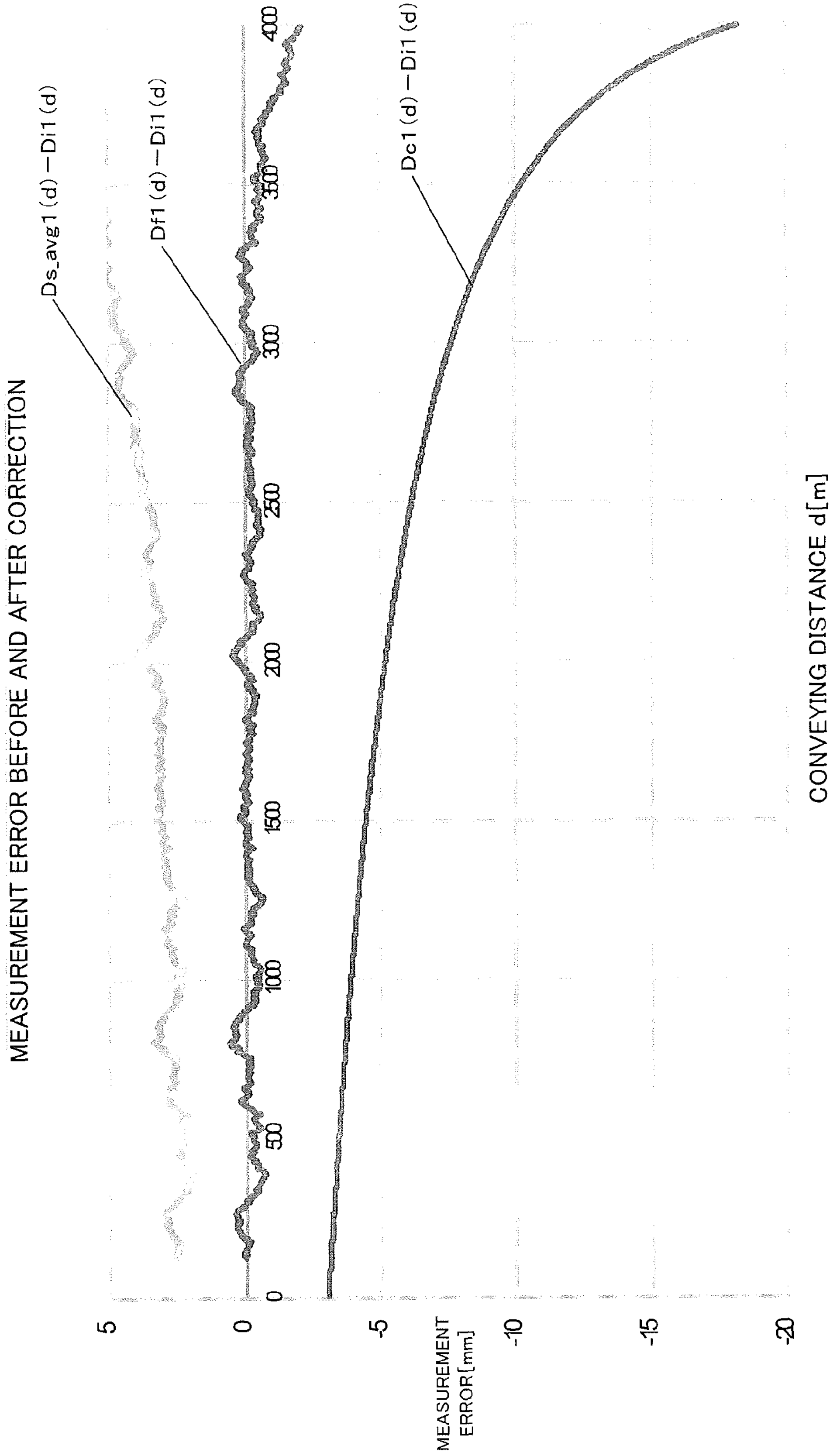
FIG. 6 is a graph showing an effect brought about by performing a correction by a difference to the example of FIG. 5.

FIG. 6 is a graph showing an effect brought about by performing a correction by a difference to the example of FIG. 5. A horizontal axis represents the conveying distance d (m) and a vertical axis represents a measurement error of the winding diameter (mm) of the printing medium M wound on the unwinding roll 71. As shown in a plot of "Ds_avg1(d)−Di1(d)" in FIG. 6, the smoothed winding diameter value Ds_avg1(d) deviates from the ideal value Di1(d) by about 2.5 (mm) or more. Further, as shown in a plot of "Dc1(d)−Di1(d)", the calculated winding diameter value Dc1(d) deviates from the ideal value Di1(d) by about 2.5 (mm) or more, and that error becomes more prominent as the conveying distance d becomes longer. In contrast, as shown in a plot of "Df1(d)−Di1(d)", an error of the corrected winding diameter value Df1(d) with respect to the ideal value Di1(d) is suppressed to be small.

Figure 7:
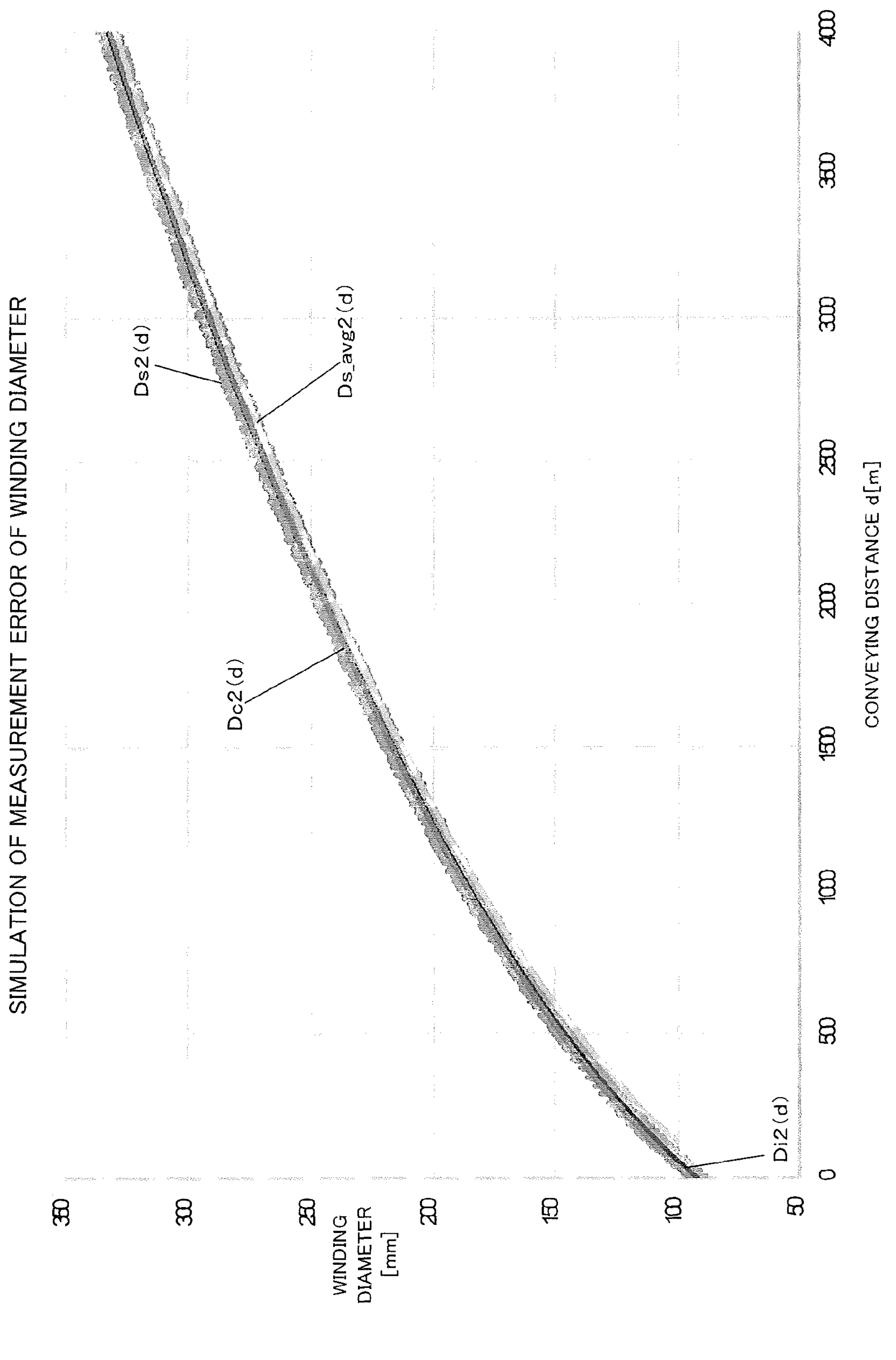
FIG. 7 is a graph showing an example of winding the printing medium M on the winding roll.

FIG. 7 is a graph showing an example of winding the printing medium M on the winding roll, wherein a horizontal axis represents the conveying distance d (m) and a vertical axis represents the winding diameter (mm) of the printing medium M wound on the winding roll 81. In this simulation, the measured winding diameter value Ds2(d) was generated in a pseudo manner by adding noise generated by a random number to the ideal value Di2(d) of the winding diameter of the printing medium M. Further, the calculated winding diameter value Dc2(d) is calculated while an error is added to the initial diameter value Do2 or the thickness value Tm of the printing medium M. As shown in FIG. 7, the calculated winding diameter value Dc2(d) steadily deviates from the ideal value Di2(d). Further, a delay by the simple moving average filter is caused in the smoothed winding diameter value Ds_avg2(d).

Figure 8:
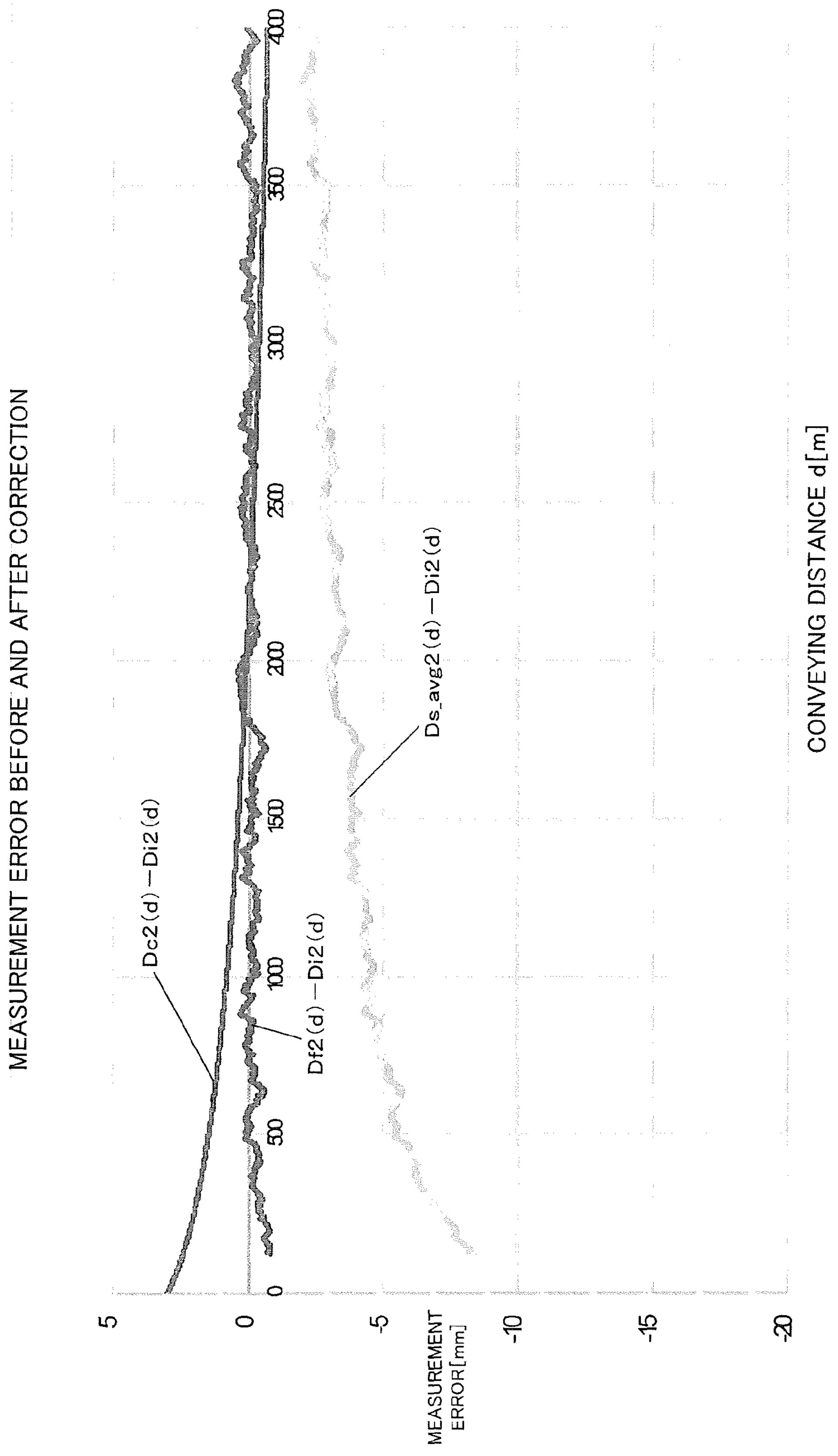
FIG. 8 is a graph showing an effect brought about by performing a correction by a difference to the example of FIG. 7.

FIG. 8 is a graph showing an effect brought about by performing a correction by a difference to the example of FIG. 7. A horizontal axis represents the conveying distance d (m) and a vertical axis represents a measurement error of the winding diameter (mm) of the printing medium M wound on the winding roll 81. As shown in a plot of "Ds_avg2(d)−Di2(d)" in FIG. 8, the smoothed winding diameter value Ds_avg2(d) deviates from the ideal value Di2(d) by about 2.5 (mm) or more. Further, as shown in a plot of "Dc2(d)−Di2(d)", the calculated winding diameter value Dc2(d) largely deviates from the ideal value Di2(d) by about 2.5 (mm) or more when the winding is started. In contrast, as shown in a plot of "Df2(d)−Di2(d)", an error of the corrected winding diameter value Df2(d) with respect to the ideal value Di2(d) is suppressed to be small.

In the embodiment described above, the printing apparatus 1 corresponds to an example of a "printing apparatus" of the invention, the conveyors 21, 31, 41 and 51 correspond to an example of a "conveyor" of the invention, the encoder 211*e* corresponds to an example of a "conveying distance meter" of the invention, the base material conveying system 6 corresponds to an example of a "base material conveying device" of the invention, the controller 61 corresponds to an example of a "controller" of the invention, the filter unit 64 corresponds to an example of a "filter unit" of the invention, the low-pass filter used for the measured winding diameter value Ds1(d) by the filter unit 64 corresponds to an example of a "first low-pass filter" of the invention, the low-pass filter used for the measured winding diameter value Ds2(d) by the filter unit 64 corresponds to an example of a "second low-pass filter" of the invention, the winding diameter calculator 65 corresponds to an example of a "winding diameter calculator" of the invention, the difference calculator 66 corresponds to an example of a "difference calculator" of the invention, the corrector 67 corresponds to an example of a "corrector" of the invention, the unwinding roll 71 corresponds to an example of an "unwinding roll" of the invention, the unwinding motor 71*m* corresponds to an example of a "first driver" of the invention, the diameter sensor 77 corresponds to an example of a "first sensor" of the invention, the diameter sensor 77 and the sensor controller 63 cooperate and function as an example of a "first diameter meter" of the invention, the winding roll 81 corresponds to an example of a "winding roll" of the invention, the winding motor 81*m* corresponds to an example of a "second driver" of the invention, the diameter sensor 87 corresponds to an example of a "second sensor" of the invention, the diameter sensor 87 and the sensor controller 63 cooperate and function as an example of a "second diameter meter" of the invention, the UI 9 corresponds to an example of a "value acquirer" of the invention, the conveying distance d corresponds to an example of a "conveying distance" of the invention, the measured winding diameter value Ds1(d) corresponds to an example of a "first measured winding diameter value" of the invention, the smoothed winding diameter value Ds_avg1(d) corresponds to an example of a "first smoothed winding diameter value" of the invention, the calculated winding diameter value Dc1(d) corresponds to an example of a "first calculated winding diameter value" of the invention, the difference Ddiff1(d) corresponds to an example of a "first difference" of the invention, the initial diameter value Do1 corresponds to an example of a "first initial diameter value" of the invention, the measured winding diameter value Ds2(d) corresponds to an example of a "second measured winding diameter value" of the invention, the smoothed winding diameter value Ds_avg2(d) corresponds to an example of a "second smoothed winding diameter value" of the invention, the calculated winding diameter value Dc2(d) corresponds to an example of a "second calculated winding diameter value" of the invention, the difference Ddiff2(d) corresponds to an example of a "second difference" of the invention, the initial diameter value Do2 corresponds to an example of a "second initial diameter value" of the invention, the thickness value Tm corresponds to an example of a "thickness value of a base material" of the invention, and the printing medium M corresponds to an example of a "base material" of the invention.

Note that the invention is not limited to the above embodiment and various changes other than the aforementioned ones can be made without departing from the gist of the invention. For example, a method for obtaining the initial diameter value Do1 is not limited to the above example, and the initial diameter value Do1 may be obtained as in the following example. In this example, with the conveyance of the printing medium M stopped, the drive controller 62 performs a pull-out operation of feeding the printing medium M from the unwinding roll 71 to the dancer roller 74 by driving the unwinding roll 71 by the unwinding motor 71*m* while controlling the drive of the dancer roller 74 by the cylinder 76 so that a certain tension is applied to the printing medium M from the dancer roller 74. In this pull-out operation, the dancer roller 74 is displaced upward to give a certain tension to the printing medium M being fed from the unwinding roll 71 to the dancer roller 74. Such a displacement amount of the dancer roller 74 is equivalent to a length of the printing medium M fed from the unwinding roll 71 to the dancer roller 74, and the drive controller 62 obtains the displacement amount of the dancer roller 74 based on a distance between the rotary shafts 751 and 752 (length of the rotary arm 75) stored in advance and an angle detected by the angle sensor 75*s* (displacement amount detector). Further, the drive controller 62 measures a rotation amount of the unwinding roll 71 in the pull-out operation by the encoder 71*e*. Then, the initial diameter value Do1 is calculated based on the displacement amount of the dancer roller 74 and the rotation amount of the unwinding roll 71. In such a configuration, since the initial diameter value Do1 can be obtained regardless of the user's operation, a workload of the user can be reduced.

Alternatively, the drive controller 62 performs a pull-back operation of winding the printing medium M on the unwinding roll 71 from the dancer roller 74 by driving the unwinding roll 71 by the unwinding motor 71*m* while controlling the drive of the dancer roller 74 by the cylinder 76 so that a certain tension is applied to the printing medium M from the dancer roller 74. In this pull-back operation, the dancer roller 74 is displaced downward to give a certain tension to the printing medium M being wound on the unwinding roll 71 from the dancer roller 74. Such a displacement amount of the dancer roller 74 is equivalent to a length of the printing medium M wound on the unwinding roll 71 from the dancer roller 74, and the drive controller 62 obtains the displacement amount of the dancer roller 74 based on the length of the rotary arm 75 and an angle detected by the angle sensor 75*s*. Further, the drive controller 62 measures a rotation amount of the unwinding roll 71 in the pull-back operation by the encoder 71*e*. Then, the initial diameter value Do1 is calculated based on the displacement amount of the dancer roller 74 and the rotation amount of the unwinding roll 71. In such a configuration, since the initial diameter value Do1 can be obtained regardless of the user's operation, a workload of the user can be reduced.

Note that the drive controller 62 can be so configured as to perform only one or both of the above pull-out operation and pull-back operation. In the case of performing the both operations, the initial diameter value Do1 may be obtained by repeatedly performing both of these operations. An accurate value can be obtained if the initial diameter value Do1 is obtained by performing the both operations.

Similarly, a method for obtaining the initial diameter value Do2 is not limited to the above example, and the initial diameter value Do2 may be obtained as in the following example. In this example, with the conveyance of the printing medium M stopped, the drive controller 62 performs a pull-out operation of feeding the printing medium M from the winding roll 81 to the dancer roller 84 by driving the winding roll 81 by the winding motor 81*m* while controlling the drive of the dancer roller 84 by the cylinder 86 so that a certain tension is applied to the printing medium M from the dancer roller 84. In this pull-out operation, the dancer roller 84 is displaced upward to give a certain tension to the printing medium M being fed from the winding roll 81 to the dancer roller 84. Such a displacement amount of the dancer roller 84 is equivalent to a length of the printing medium M fed from the winding roll 81 to the dancer roller 84, and the drive controller 62 obtains the displacement amount of the dancer roller 84 based on a distance between the rotary shafts 851 and 852 (length of the rotary arm 85) stored in advance and an angle detected by the angle sensor 85*s* (displacement amount detector). Further, the drive controller 62 measures a rotation amount of the winding roll 81 in the pull-out operation by the encoder 81*e*. Then, the initial diameter value Do2 is calculated based on the displacement amount of the dancer roller 84 and the rotation amount of the winding roll 81. In such a configuration, since the initial diameter value Do2 can be obtained regardless of the user's operation, a workload of the user can be reduced.

Alternatively, the drive controller 62 performs a pull-back operation of winding the printing medium M on the winding roll 81 from the dancer roller 84 by driving the winding roll 81 by the winding motor 81*m* while controlling the drive of the dancer roller 84 by the cylinder 86 so that a certain tension is applied to the printing medium M from the dancer roller 84. In this pull-back operation, the dancer roller 84 is displaced downward to give a certain tension to the printing medium M being wound on the winding roll 81 from the dancer roller 84. Such a displacement amount of the dancer roller 84 is equivalent to a length of the printing medium M wound on the winding roll 81 from the dancer roller 84, and the drive controller 62 obtains the displacement amount of the dancer roller 84 based on the length of the rotary arm 85 and an angle detected by the angle sensor 85*s*. Further, the drive controller 62 measures a rotation amount of the winding roll 81 in the pull-back operation by the encoder 81*e*. Then, the initial diameter value Do2 is calculated based on the displacement amount of the dancer roller 84 and the rotation amount of the winding roll 81. In such a configuration, since the initial diameter value Do2 can be obtained regardless of the user's operation, a workload of the user can be reduced.

Note that the drive controller 62 may be so configured as to perform only one or both of the above pull-out operation and pull-back operation. In the case of performing the both operations, the initial diameter value Do2 may be obtained by repeatedly performing both of these operations. An accurate value can be obtained if the initial diameter value Do2 is obtained by performing the both operations.

Note that, in the above example of the method for obtaining the initial diameter value Do1, the rotary arm 75, the rotary shafts 751, 752 of the rotary arm 75 and the cylinder 76 correspond to an example of a "roller driver" of the invention.

Further, the filter used as the low-pass filter is not limited to the simple moving average filter and another moving average filter may be used. In short, various low-pass filters for removing high-frequency noise can be used.

Further, the type of the printing medium M is not limited to transparent films and may be paper. The type of the diameter sensors 77, 87 is not limited to ultrasonic sensors and may be optical sensors or the like.

Further, the conveying speed of the printing medium M may be obtained by an encoder mounted on another motor for conveying the printing medium M or an encoder mounted on a roller driven by the conveyance of the printing medium M without depending on the encoder 211*e* of the conveyor motor 211*m*.

Further, the printing apparatus 1 is not limited to the one for printing by an ink-jet method, and may print images by off-set printing.

Figure 9:
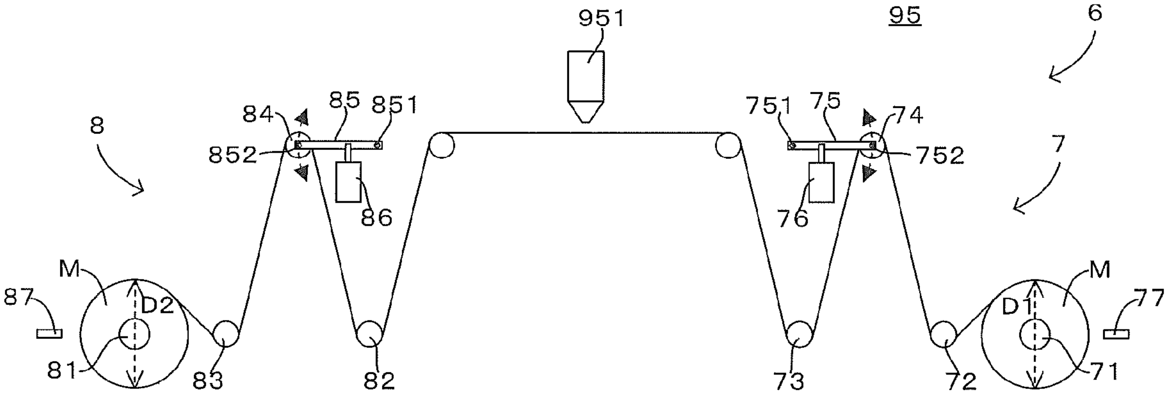
FIG. 9 is a front view schematically showing an example of a coating apparatus according to the invention.

Further, an application object of the base material conveying device of the invention is not limited to the printing apparatus 1 and may be, for example, a coating apparatus. FIG. 9 is a front view schematically showing an example of a coating apparatus according to the invention. This coating apparatus 95 includes a base material conveying system 6 which conveys a metal foil M (base material) from an unwinder 7 to a winder 8 in a roll-to-roll manner. Further, the coating apparatus 95 includes a slit nozzle 951 to discharge electrode slurry, which is a coating liquid, and the electrode slurry discharged from the slit nozzle 951 is applied on the metal foil M. The base material conveying system 6 of such a coating apparatus 95 has a configuration similar to the above one. Therefore, a diameter of the metal foil M wound on a roll can be precisely obtained.

As described above, the base material conveying device may be configured so that the value acquirer obtains the first initial diameter value by a user input. In such a configuration, the first initial diameter value can be relatively easily obtained.

The base material conveying device may further comprises: a dancer roller, the base material being wound on the dancer roller between the unwinding roll and the conveyor; a roller driver which displaces the dancer roller so that a certain tension is given to the base material from the dancer roller; a displacement amount detector which detects a displacement amount of the dancer roller; and an encoder which measures a rotation amount of the unwinding roll, wherein the value acquirer performs at least one operation of a pull-out operation of feeding the base material from the unwinding roll to the dancer roller and a pull-back operation of winding the base material on the unwinding roll from the dancer roller by driving the unwinding roll by the first driver with the conveyance of the base material by the conveyor stopped, and obtains the first initial diameter value by calculating the first initial diameter value based on a displacement amount of the dancer roller and a rotation amount of the unwinding roll during the execution of the one operation. In such a configuration, since the first initial diameter value can be obtained regardless of a user operation, a workload of the user can be reduced.

The base material conveying device may be configured so that the difference calculator compensates for the delay by shifting the plurality of first calculated winding diameter values with respect to the conveying distance by an amount equivalent to the delay by the first low-pass filter. By calculating the difference between the calculated winding diameter value and the smoothed winding diameter value while compensating for the delay by the low-pass filter in this way, a difference giving a value close to an error of the calculated winding diameter value with respect to the ideal value of the diameter of the base material can be precisely obtained.

The base material conveying device may be configured so that the first low-pass filter is a moving average filter. The high-frequency noise can be precisely removed from the plurality of measured winding diameter values by such a moving average filter.

The base material conveying device may be configured so that the first sensor is an ultrasonic sensor; and the base material is transparent. In such a configuration, the diameter of the transparent base material can be measured by the ultrasonic sensor. Since a measurement result by the ultrasonic sensor includes noise, the application of the invention is particularly preferred.

The base material conveying device may further comprises: a winding roll on which the base material conveyed by the conveyor is wound; a second driver which rotationally drives the winding roll to wind the base material on the winding roll; and a second diameter meter which includes a second sensor facing the base material wound on the winding roll and measures a plurality of second measured winding diameter values corresponding to the conveying distance by measuring the diameter of the base material wound on the winding roll a plurality of times by the second sensor at the time of conveying the base material by the conveyor, wherein: the value acquirer obtains a second initial diameter value which is a value of the diameter of the base material wound on the winding roll before the conveyance of the base material by the conveyor is started, the winding diameter calculator calculates a plurality of second calculated winding diameter values corresponding to the conveying distance by calculating the value of the diameter of the base material wound on the winding roll a plurality of times at the time of conveying the base material by the conveyor based on the second initial diameter value and the thickness value of the base material obtained by the value acquirer and the conveying distance measured by the conveying distance meter; the filter unit smooths the plurality of second measured winding diameter values corresponding to the conveying distance by a second low-pass filter to extract a plurality of second smoothed winding diameter values corresponding to the conveying distance; the difference calculator calculates a plurality of second differences corresponding to the conveying distance by performing an operation of calculating a difference between the second calculated winding diameter value and the second smoothed winding diameter value while compensating for a delay by the second low-pass filter for the plurality of second calculated winding diameter values and the plurality of second smoothed winding diameter values; and the corrector corrects the plurality of second calculated winding diameter values corresponding to the conveying distance by the plurality of second difference corresponding to the conveying distance.

In such a configuration, the plurality of measured winding diameter values corresponding to the conveying distance are measured by measuring the diameter of the base material wound on the winding roll a plurality of times by the sensor facing the base material wound on the winding roll at the time of conveying the base material by the conveyor. Then, the plurality of measured winding diameter values corresponding to the conveying distance are smoothed by the low-pass filter to extract the plurality of smoothed winding diameter values corresponding to the conveying distance. In this way, the plurality of smoothed winding diameter values can be obtained by removing high-frequency noise from the plurality of measured winding diameter values. Further, by calculating the value of the diameter of the base material wound on the winding roll a plurality of times based on the initial diameter value, the thickness and the conveying distance of the base material at the time of conveying the base material by the conveyor, the plurality of calculated winding diameter values corresponding to the conveying distance are calculated. The plurality of smoothed winding diameter values and the plurality of calculated winding diameter values prepared in this way are mutually shifted with respect to the conveying distance due to the delay of the low-pass filter. Accordingly, the operation of calculating the difference between the calculated winding diameter value and the smoothed winding diameter value while compensating for the delay by the low-pass filter is performed for the plurality of calculated winding diameter values and the plurality of smoothed winding diameter values, whereby the plurality of differences corresponding to the conveying distance are calculated. Such differences can be regarded as values close to errors of the calculated winding diameter values with respect to ideal values of the diameter of the base material. Accordingly, the plurality of calculated winding diameter values corresponding to the conveying distance are corrected by the plurality of differences corresponding to the conveying distance. In this way, the diameter of the base material wound on the winding roll can be accurately obtained.

The invention is applicable to base material conveying techniques in general for roll-to-roll conveyance.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. A base material conveying device, comprising:

an unwinding roll on which a base material in the form of an elongated band is wound;

a first driver which rotationally drives the unwinding roll to unwind the base material wound on the unwinding roll:

a conveyor which conveys the base material unwound from the unwinding roll;

a conveying distance meter which measures a conveying distance of the base material unwound from the unwinding roll and conveyed;

a first diameter meter which includes a first sensor facing the base material wound on the unwinding roll and measures a plurality of first measured winding diameter values corresponding to the conveying distance by measuring a diameter of the base material wound on the unwinding roll a plurality of times by the first sensor at the time of conveying the base material by the conveyor;

a value acquirer which obtains a first initial diameter value which is a value of the diameter of the base material wound on the unwinding roll before the conveyance of the base material by the conveyor is started and a thickness value of the base material; and a controller including:

a winding diameter calculator which calculates a plurality of first calculated winding diameter values corresponding to the conveying distance by calculating the value of the diameter of the base material wound on the unwinding roll a plurality of times at the time of conveying the base material by the conveyor based on the first initial diameter value and the thickness value of the base material obtained by the value acquirer and the conveying distance measured by the conveying distance meter;

a filter unit which smooths the plurality of first measured winding diameter values corresponding to the conveying distance by a first low-pass filter to extract a plurality of first smoothed winding diameter values corresponding to the conveying distance;

a difference calculator which calculates a plurality of first differences corresponding to the conveying distance by performing an operation of calculating a difference between the first calculated winding diameter value and the first smoothed winding diameter value while compensating for a delay by the first low-pass filter for the plurality of first calculated winding diameter values and the plurality of first smoothed winding diameter values; and a corrector which corrects the plurality of first calculated winding diameter values corresponding to the conveying distance by the plurality of first differences corresponding to the conveying distance.

2. The base material conveying device according to claim 1, wherein the value acquirer obtains the first initial diameter value by a user input.

3. The base material conveying device according to claim 1, further comprising:

a dancer roller, the base material being wound on the dancer roller between the unwinding roll and the conveyor;

a roller driver which displaces the dancer roller so that a certain tension is given to the base material from the dancer roller;

a displacement amount detector which detects a displacement amount of the dancer roller; and an encoder which measures a rotation amount of the unwinding roll, wherein the value acquirer performs at least one operation of a pull-out operation of feeding the base material from the unwinding roll to the dancer roller and a pull-back operation of winding the base material on the unwinding roll from the dancer roller by driving the unwinding roll by the first driver with the conveyance of the base material by the conveyor stopped, and obtains the first initial diameter value by calculating the first initial diameter value based on a displacement amount of the dancer roller and a rotation amount of the unwinding roll during the execution of the one operation.

4. The base material conveying device according to claim 1, wherein the difference calculator compensates for the delay by shifting the plurality of first calculated winding diameter values with respect to the conveying distance by an amount equivalent to the delay by the first low-pass filter.

5. The base material conveying device according to claim 1, wherein the first low-pass filter is a moving average filter.

6. The base material conveying device according to claim 1, wherein:

the first sensor is an ultrasonic sensor; and the base material is transparent.

7. The base material conveying device according to claim 1, further comprising:

a winding roll on which the base material conveyed by the conveyor is wound;

a second driver which rotationally drives the winding roll to wind the base material on the winding roll; and a second diameter meter which includes a second sensor facing the base material wound on the winding roll and measures a plurality of second measured winding diameter values corresponding to the conveying distance by measuring the diameter of the base material wound on the winding roll a plurality of times by the second sensor at the time of conveying the base material by the conveyor, wherein:

the value acquirer obtains a second initial diameter value which is a value of the diameter of the base material wound on the winding roll before the conveyance of the base material by the conveyor is started, the winding diameter calculator calculates a plurality of second calculated winding diameter values corresponding to the conveying distance by calculating the value of the diameter of the base material wound on the winding roll a plurality of times at the time of conveying the base material by the conveyor based on the second initial diameter value and the thickness value of the base material obtained by the value acquirer and the conveying distance measured by the conveying distance meter;

the filter unit smooths the plurality of second measured winding diameter values corresponding to the conveying distance by a second low-pass filter to extract a plurality of second smoothed winding diameter values corresponding to the conveying distance;

the difference calculator calculates a plurality of second differences corresponding to the conveying distance by performing an operation of calculating a difference between the second calculated winding diameter value and the second smoothed winding diameter value while compensating for a delay by the second low-pass filter for the plurality of second calculated winding diameter values and the plurality of second smoothed winding diameter values; and the corrector corrects the plurality of second calculated winding diameter values corresponding to the conveying distance by the plurality of second difference corresponding to the conveying distance.

* * * * *